(12) United States Patent
Shigeta et al.

(10) Patent No.: US 10,987,914 B2
(45) Date of Patent: Apr. 27, 2021

(54) GRIPPER OF A ROBOT FOR GRAVURE PLATE-MAKING ROLL

(71) Applicant: THINK LABORATORY CO., LTD., Chiba (JP)

(72) Inventors: Tatsuo Shigeta, Chiba (JP); Kaku Shigeta, Chiba (JP)

(73) Assignee: THINK LABORATORY CO., LTD., Chiba (JP)

( * ) Notice: Subject to any disclaimer, the term of this patent is extended or adjusted under 35 U.S.C. 154(b) by 0 days.

(21) Appl. No.: 16/765,784

(22) PCT Filed: Nov. 22, 2018

(86) PCT No.: PCT/JP2018/043193
§ 371 (c)(1),
(2) Date: May 20, 2020

(87) PCT Pub. No.: WO2019/116854
PCT Pub. Date: Jun. 20, 2019

(65) Prior Publication Data
US 2020/0353744 A1   Nov. 12, 2020

(30) Foreign Application Priority Data

Dec. 11, 2017   (JP) .............................. JP2017-237060

(51) Int. Cl.
*B41F 9/18* (2006.01)
*B25J 15/02* (2006.01)
(Continued)

(52) U.S. Cl.
CPC .............. *B41F 9/18* (2013.01); *B05C 1/0808* (2013.01); *B41F 13/11* (2013.01); *B41F 27/105* (2013.01); *B25J 15/0038* (2013.01)

(58) Field of Classification Search
CPC .. B25J 15/0253; B25J 15/026; B25J 15/0266; B25J 15/0273; B25J 15/028;
(Continued)

(56) References Cited

U.S. PATENT DOCUMENTS 4,878,705 A    11/1989  Arnquist
2014/0265401 A1*  9/2014  Allen Demers ..... B25J 15/0009
                                                      294/201

FOREIGN PATENT DOCUMENTS

JP         4-283089 A       10/1992
JP         05016180 U   *   3/1993
(Continued)

*Primary Examiner* — Gerald McClain
(74) *Attorney, Agent, or Firm* — McGlew and Tuttle, P.C.

(57) ABSTRACT

Provided is a gripping portion structure of a gravure plate-making robot in which the accurate gripping of an unprocessed plate-making roll and the positioning accuracy during transfer of the unprocessed plate-making roll to each processing device can be improved by causing a gravure plate-making robot to exhibit a high gripping force when gripping the unprocessed plate-making roll. The gripping portion structure of a gravure plate-making robot to be used in a fully automatic gravure plate-making processing system for manufacturing a gravure plate-making roll by gripping and transferring an unprocessed plate-making roll to each processing device includes: a pair of gripping plates to be mounted on an arm distal end of the gravure plate-making robot, the pair of gripping plates being freely spaced widely or narrowly from each other, and being configured to grip both end portions of the unprocessed plate-making roll; and a gripping surface forming member provided on each of the pair of gripping plates, the gripping surface forming member having a gripping surface that is curved so as to be recessed toward a center of the end portion of the unprocessed plate-making roll to be gripped and having a non-slip function.

5 Claims, 6 Drawing Sheets

(51) Int. Cl.
*B05C 1/08* (2006.01)
*B41F 13/11* (2006.01)
*B41F 27/10* (2006.01)
*B25J 15/00* (2006.01)

(58) Field of Classification Search
CPC ...... B25J 15/0286; B25J 15/0293; B41F 9/18;
B41F 13/11; B41F 27/105
See application file for complete search history.

(56) References Cited

FOREIGN PATENT DOCUMENTS

| | | |
|---|---|---|
| JP | H05-016180 U | 3/1993 |
| JP | 2009-39820 A | 2/2009 |
| JP | 2015-112662 A | 6/2015 |
| WO | 2013058151 A1 | 4/2013 |

\* cited by examiner (a)

(b)

GRIPPER OF A ROBOT FOR GRAVURE PLATE-MAKING ROLL

TECHNICAL FIELD

The present invention relates to a gripping portion structure of a gravure plate-making robot to be used in a fully automatic gravure plate-making processing system for manufacturing a gravure plate-making roll by gripping and transferring an unprocessed plate-making roll being a hollow cylinder roll to each processing device.

BACKGROUND ART

In a general gravure plate-making roll, plate making (making of a plate surface) is completed through the processes of: providing a copper-plating layer (plate material) for forming a plate surface to a surface of a plate base material that is a hollow cylinder roll made of a metal, for example, aluminum or iron or a hollow cylinder roll made of plastics, for example, carbon fiber reinforced plastics (CFRP); forming a large number of minute recesses (gravure cells) in the copper-plating layer in accordance with plate making information by etching or an electronic engraving method; and then forming a hard layer through use of a chromium-plating layer, a diamond-like carbon (DLC) layer, or the like for increasing plate durability of the gravure plate-making roll to provide a surface reinforcing coating layer.

In manufacturing of the gravure plate-making roll, the applicant of the present application has provided a fully automatic gravure plate-making processing system with which a gravure plate-making roll can be manufactured rapidly as compared to the related art, space can be saved, unmanned operation can be performed even at night, a manufacturing line can be flexibly customized, and various demands from customers can be satisfied, and the fully automatic gravure plate-making processing system has attracted good reviews. As an example of the fully automatic gravure plate-making processing system, there is given a fully automatic gravure plate-making processing system disclosed in Patent Document 1. In Patent Document 1, there is disclosed a remote administration method for a plate-making consumable material in the fully automatic gravure plate-making processing system.

In the fully automatic gravure plate-making processing system disclosed in Patent Document 1, as illustrated in FIG. 1 of Patent Document 1, two gravure plate-making robots including a first industrial robot and a second industrial robot are used. Gripping portions configured to grip an unprocessed plate-making roll are mounted on distal ends of respective robot arms. As illustrated in FIG. 2 and FIG. 3 of Patent Document 1, by widening or narrowing the space of the gripping portions, the unprocessed plate-making roll is gripped and transferred to each processing device.

Meanwhile, in recent years, the hollow cylinder roll being a plate base material has various weights of from about 7 kg to about 140 kg, and the weight of the hollow cylinder roll constitutes a weight of the unprocessed plate-making roll. The hollow cylinder roll has also various lengths of from about 400 mm to about 1,400 mm, and the length of the hollow cylinder roll constitutes a length of the unprocessed plate-making roll. In addition, it is required that the unprocessed plate-making roll being a hollow cylinder roll be rotated under the condition of being mounted on each processing device, and hence the unprocessed plate-making roll cannot be successfully rotated without a core of a chuck cone being matched with a core of the unprocessed plate-making roll. To cope with this, it is required that the unprocessed plate-making roll be accurately set in the processing device, with the result that the positioning accuracy, and the like are important.

Consequently, in order to cause the gravure plate-making robot to grip the unprocessed plate-making roll, a high gripping force is required. In recent years, there has been required that the gravure plate-making robot is adaptable to various kinds of unprocessed plate-making rolls. Further, the manufacturing line of the fully automatic gravure plate-making processing system has also been varied, and hence it was also required that the gravure plate-making robot be adaptable to the various manufacturing lines.

PRIOR ART DOCUMENT

Patent Document

DISCLOSURE OF THE INVENTION

Problems to be Solved by the Invention

The present invention has been made in view of the above-mentioned related-art problems, and an object of the present invention is to provide a gripping portion structure of a gravure plate-making robot, with which the accurate gripping of an unprocessed plate-making roll and the positioning accuracy during transfer of the unprocessed plate-making roll to each processing device can be improved by causing a gravure plate-making robot to exhibit a high gripping force when gripping the unprocessed plate-making roll.

Means for Solving Problems

In order to solve the problems described above, according to one embodiment of the present invention, there is provided a gripping portion structure of a gravure plate-making robot to be used in a fully automatic gravure plate-making processing system for manufacturing a gravure plate-making roll by gripping and transferring an unprocessed plate-making roll being a hollow cylinder roll to each processing device, the gripping portion structure of a gravure plate-making robot including: a pair of gripping plates to be mounted on an arm distal end of the gravure plate-making robot, the pair of gripping plates being freely spaced widely or narrowly from each other, and being configured to grip both end portions of the unprocessed plate-making roll; and a gripping surface forming member provided on each of the pair of gripping plates, the gripping surface forming member having a gripping surface that is curved so as to be recessed toward a center of the end portion of the unprocessed plate-making roll to be gripped and having a non-slip function.

Preferably, the gripping surface forming member is made of a rubber or a synthetic resin.

Preferably, the gripping surface forming member includes a plurality of gripping surface forming members, and the plurality of gripping surface forming members form a gripping surface.

Preferably, each of the pair of gripping plates has a gripping plate cutout portion opened downwardly, and the gripping surface forming member also has a gripping surface forming member cutout portion so as to correspond to the gripping plate cutout portion.

Advantageous Effects of the Invention

According to the present invention, the gripping portion structure of the gravure plate-making robot, with which the accurate gripping of an unprocessed plate-making roll and the positioning accuracy during transfer of the unprocessed plate-making roll to each processing device can be improved by causing a gravure plate-making robot to exhibit a high gripping force when gripping the unprocessed plate-making roll.

DESCRIPTION OF EMBODIMENTS

Embodiments of the present invention are described below, but those embodiments are described as examples, and hence it is understood that various modifications may be made thereto without departing from the technical spirit of the present invention.

Figure 1:
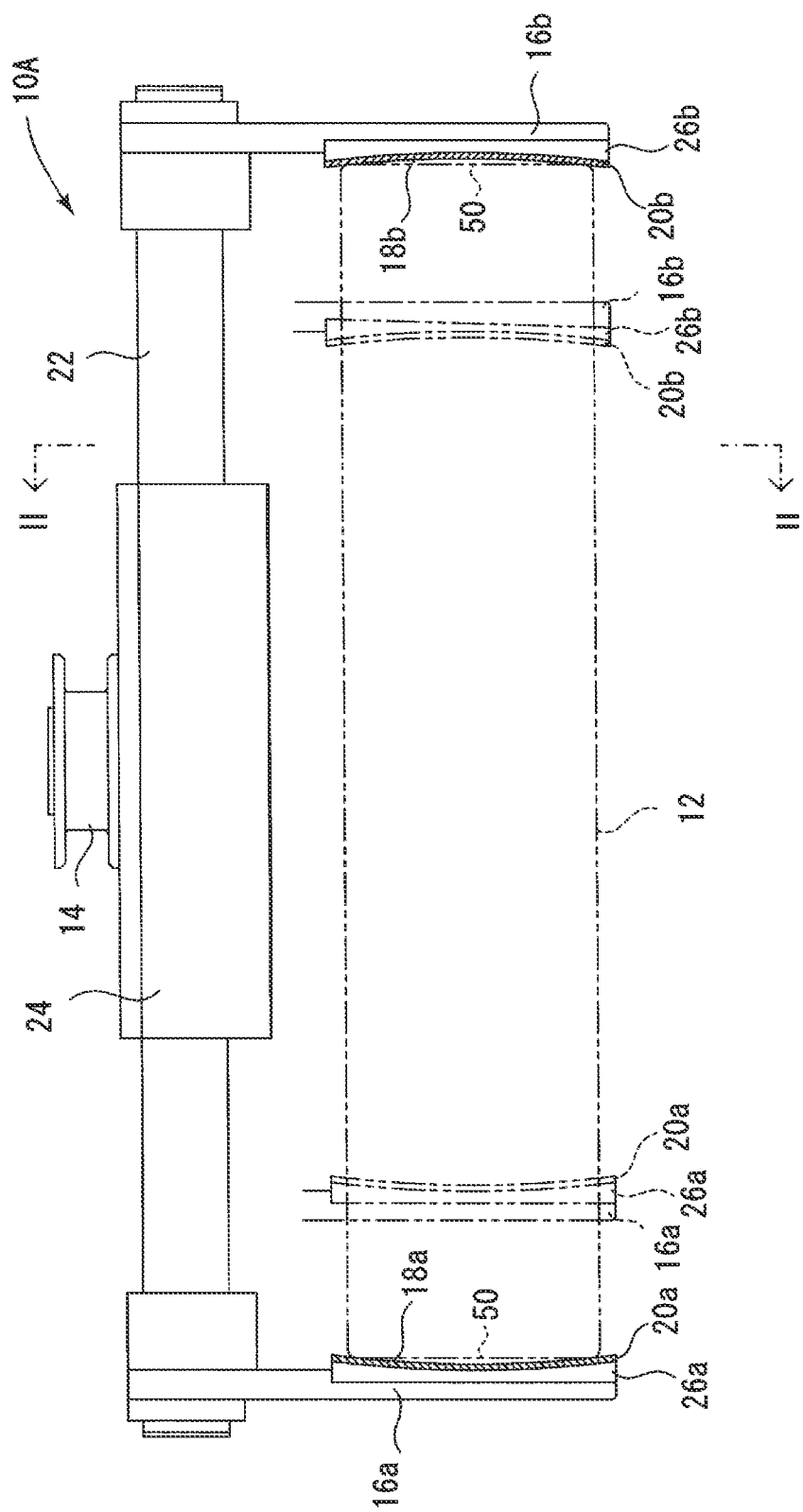
FIG. 1 is a schematic outline plan view for illustrating one embodiment of a gripping portion structure of a gravure plate-making robot according to the present invention.
Figure 2:
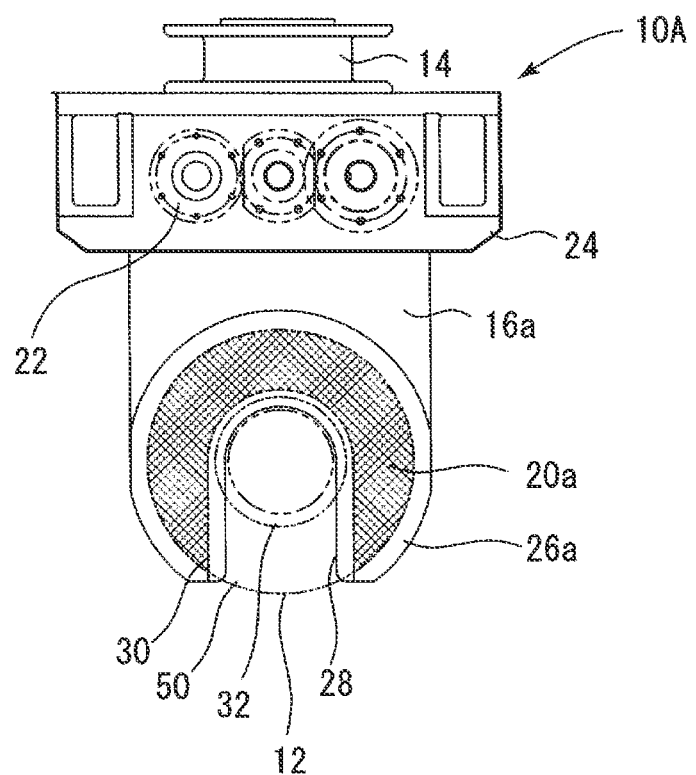
FIG. 2 is a schematic side view for illustrating a gripping surface forming member when viewed from the line II-II direction of FIG. 1.

A gripping portion structure of a gravure plate-making robot according to one embodiment of the present invention is illustrated in FIG. 1 and FIG. 2. In FIG. 1 and FIG. 2, there is illustrated a gripping portion structure 10A of a gravure plate-making robot according to one embodiment of the present invention.

The gripping portion structure 10A of the gravure plate-making robot is a gripping portion structure of the gravure plate-making robot to be used in a fully automatic gravure plate-making processing system for manufacturing a gravure plate-making roll by gripping and transferring an unprocessed plate-making roll 12 being a hollow cylinder roll to each processing device. The gripping portion structure 10A of a gravure plate-making robot includes a pair of gripping plates 16a and 16b and gripping surface forming members 20a and 20b. The pair of gripping plates 16a and 16b is mounted on an arm distal end 14 of the gravure plate-making robot. The pair of gripping plates 16a and 16b is freely spaced widely or narrowly from each other, and is configured to grip both end portions of the unprocessed plate-making roll 12. The gripping surface forming members 20a and 20b are provided on the gripping plates 16a and 16b, respectively. The gripping surface forming members 20a and 20b have gripping surfaces 18a and 18b that are curved so as to be recessed toward a center of end portions 50 of the unprocessed plate-making roll 12 to be gripped, and have a non-slip function.

As shown in the drawings, the gripping surfaces 18a and 18b have a curve. This curve has a dimension which is greater than a diameter of the roll 12. This curve is configured to cause the first and second gripping surfaces to contact the gravure plate-making roll predominantly at an outer circumferential edge of a respective one of the axial end portions of the gravure plate-making roll.

The gripping plates 16a and 16b are mounted on the arm distal end 14 through intermediation of a frame portion 22. When the frame portion 22 is expanded or contracted by a drive portion 24, the gripping plates 16a and 16b are spaced widely or narrowly.

In the example of FIG. 1 and FIG. 2, there is illustrated the case in which the gripping surface forming members 20a and 20b having a non-slip function are made of a rubber. As long as the gripping surface forming members 20a and 20b have a non-slip function, a synthetic resin, for example, a silicon resin may also be used other than the rubber. The gripping surface forming member 20a and 20b are mounted on the gripping plates 16a and 16b through intermediation of mounting members 26a and 26b, respectively.

In the illustrated example, there is illustrated a case in which the gripping plates 16a and 16b are made of iron, and the mounting members 26a and 26b are made of titanium. Surfaces of the mounting members 26a and 26b are curved, and the gripping surface forming members 20a and 20b are bonded to the curved surfaces. The surfaces of the mounting members 26a and 26b are curved as described above, and hence the gripping surface forming members 20a and 20b are brought into a curved state.

Further, the gripping plates 16a and 16b each have a gripping plate cutout portion 28 opened downwardly, and the gripping surface forming members 20a and 20b each also have a gripping surface forming member cutout portion 30 so as to correspond to the gripping plate cutout portion 28.

A flange 32 to be brought into abutment against a chuck cone of each processing device of the fully automatic gravure plate-making processing system is mounted on an inner peripheral surface of a hollow portion of the unprocessed plate-making roll 12. Thus, the gripping plate cutout portion 28 is opened downwardly so as to correspond to the flange 32. Further, preferably, a radius of curvature of the gripping plate cutout portion 28 is the same as that of the flange 32.

With the above-mentioned configuration, when the unprocessed plate-making roll 12 is gripped by the gravure plate-making robot, the gripping surface forming members 20a and 20b are curved so as to be recessed toward a center of the end portions 50 of the unprocessed plate-making roll 12, and have a non-slip function. Therefore, a high gripping force can be exhibited. With this, the accurate gripping of the unprocessed plate-making roll 12 and the positioning accuracy during transfer of the unprocessed plate-making roll 12 to each processing device can be improved. In FIG. 1, an example of the case, in which the gripping plates 16a and 16b are spaced narrowly to grip the shorter unprocessed plate-making roll 12, is also illustrated with the imaginary line.

Further, in the illustrated example, there is illustrated a case in which the surfaces of the mounting members 26a and 26b are curved, and hence the gripping surface forming members 20a and 20b are curved. Besides the illustrated example, for example, the following configuration may be adopted. The surfaces of the mounting members 26a and 26b are set to be flat, and the gripping surface forming members 20a and 20b having a non-slip function are curved. Further, the following configuration may also be adopted. The surfaces of the gripping plates 16a and 16b are curved as in the surfaces of the illustrated mounting members 26a and 26b, without using the mounting members 26a and 26b, and the gripping surface forming members 20a and 20b are bonded to the curved surfaces to be curved.

Figure 3:
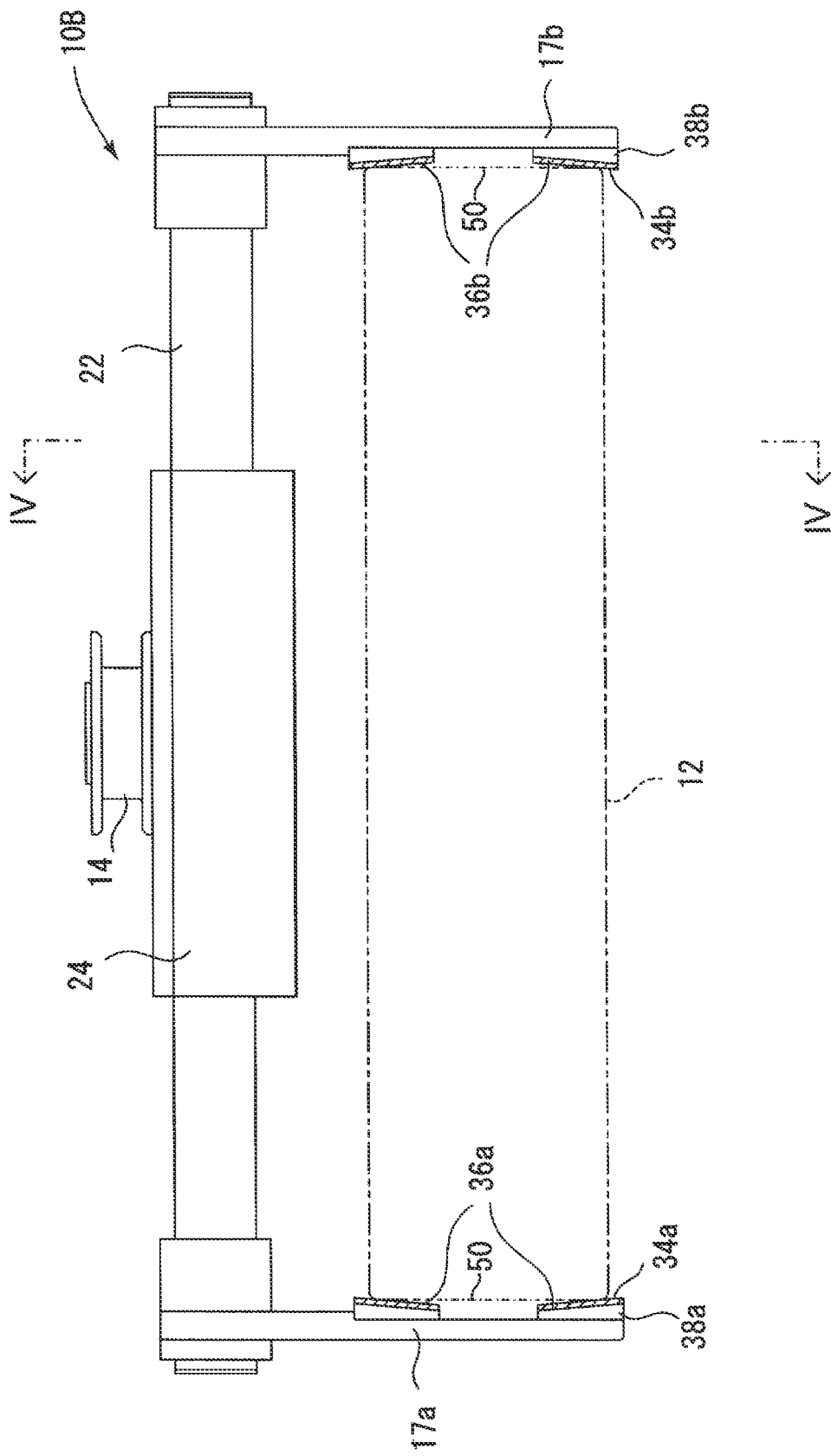
FIG. 3 is a schematic outline plan view for illustrating another embodiment of a gripping portion structure of a gravure plate-making robot according to the present invention.
Figure 4:
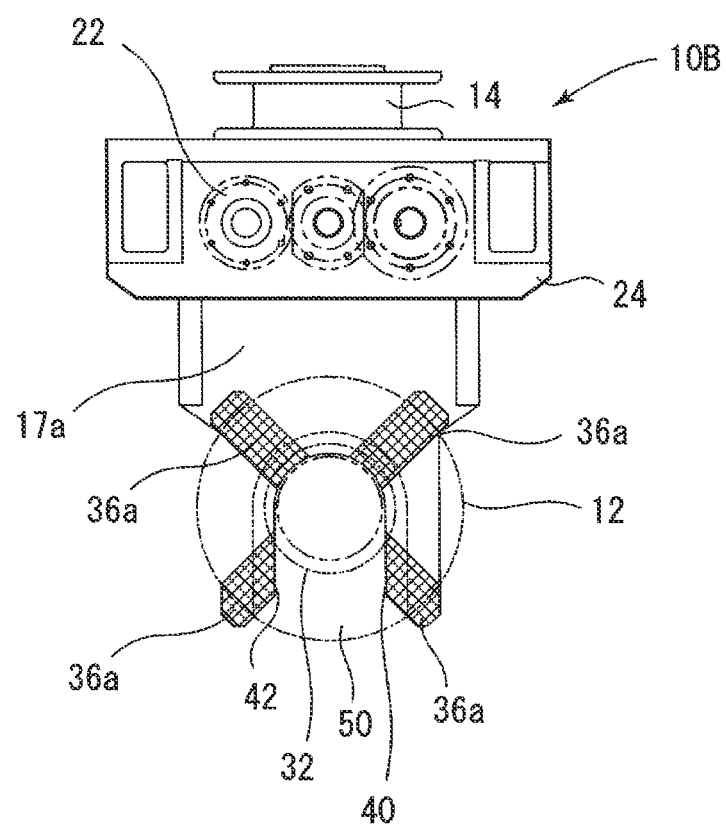
FIG. 4 is a schematic side view for illustrating a gripping surface forming member when viewed from the line IV-IV direction of FIG. 3.

Next, a gripping portion structure of a gravure plate-making robot according to another embodiment of the present invention is illustrated in FIG. 3 and FIG. 4. In FIG. 3 and FIG. 4, there is illustrated a gripping portion structure 10B of a gravure plate-making robot according to another embodiment of the present invention.

The gripping portion structure 10B of a gravure plate-making robot is a gripping portion structure of a gravure plate-making robot used in a fully automatic gravure plate-making processing system for manufacturing a gravure plate-making roll by gripping and transferring the unprocessed plate-making roll 12 being a hollow cylinder roll to each processing device. The gripping portion structure 10B of a gravure plate-making robot includes a pair of gripping plates 17a and 17b and gripping surface forming members 36a and 36b. The gripping plates 17a and 17b are mounted on the arm distal end 14 of the gravure plate-making robot, are freely spaced widely or narrowly from each other, and are configured to grip both end portions of the unprocessed plate-making roll 12. The gripping surface forming members 36a and 36b are provided on the gripping plates 17a and 17b, respectively. The gripping surface forming members 36a and 36b have gripping surfaces 34a and 34b that are curved so as to be recessed toward a center of the end portions 50 of the unprocessed plate-making roll 12 to be gripped, and have a non-slip function.

In the same manner as in the gripping portion structure 10A, the gripping plates 17a and 17b are mounted on the arm distal end 14 through intermediation of the frame portion 22. When the frame portion 22 is expanded or contracted by the drive portion 24, the gripping plates 17a and 17 are spaced widely or narrowly.

Also in the example of FIG. 3 and FIG. 4, there is illustrated a case in which the gripping surface forming members 36a and 36b having a non-slip function are made of a rubber. The gripping surface forming members 36a and 36b are mounted on the gripping plates 17a and 17b through intermediation of mounting members 38a and 38b, respectively.

In the gripping portion structure 10B, the gripping surface forming members 36a and 36b are each formed of a plurality of gripping surface forming members. In the illustrated example, there is illustrated a case in which four rubber plates are bonded, as the gripping surface forming members 36a and 36b, to the mounting members 38a and 38b in a radial manner, respectively, as well-illustrated in FIG. 4.

In the illustrated example, there is illustrated a case in which the gripping plates 17a and 17b are made of iron, and the mounting members 38a and 38b are made of titanium. Surfaces of the mounting members 38a and 38b are curved, and the gripping surface forming members 36a and 36b are bonded to the curved surfaces. The surfaces of the mounting members 38a and 38b are curved as described above, and hence the gripping surface forming members 36a and 36b are brought into a curved state, as illustrated in FIG. 3.

Further, the gripping plates 17a and 17b each have a gripping plate cutout portion 40 opened downwardly, and the gripping surface forming members 36a and 36b each also have a gripping surface forming member cutout portion 42 corresponding to the gripping plate cutout portion 40.

The gripping plate cutout portion 40 is opened downwardly so as to correspond to the flange 32. Further, preferably, a radius of curvature of the gripping plate cutout portion 40 is the same as that of the flange 32.

With the above-mentioned configuration, when the unprocessed plate-making roll 12 is gripped by the gravure plate-making robot, the gripping surface forming members 36a and 36b are curved so as to be recessed toward a center of the end portions 50 of the unprocessed plate-making roll 12 and have a non-slip function. Therefore, a high gripping force can be exhibited. With this, the accurate gripping of the unprocessed plate-making roll 12 and the positioning accuracy during transfer of the unprocessed plate-making roll 12 to each processing device can be improved.

Figure 5:
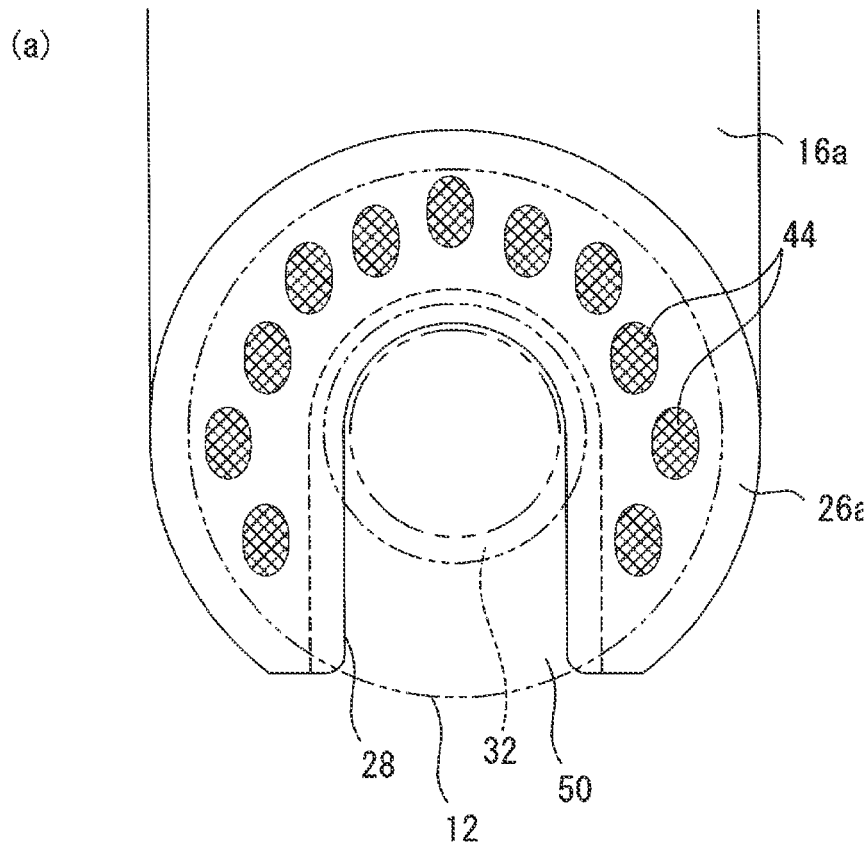
FIG. 5 are views for illustrating another embodiment of a gripping surface forming member, in which part (a) is a schematic outline side view, and part (b) is a sectional view of a main part thereof.
Figure 5:
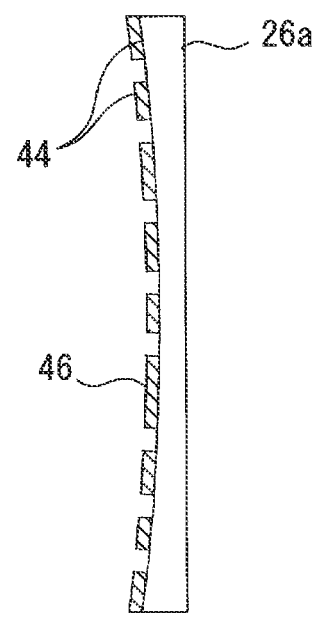

Further, as the gripping surface forming member having a non-slip function, besides the above-mentioned examples of the gripping surface forming member, for example, a plurality of gripping surface forming members having a non-slip function as in gripping surface forming members 44 illustrated in FIG. 5 may be adopted. In the example of FIG. 5, there is illustrated a case in which a plurality of rubber plates are bonded to the mounting member 26a illustrated in FIG. 1 and FIG. 2 to provide the gripping surface forming members 44 each having a non-slip function and having a gripping surface 46 curved so as to be recessed toward a center the end portion of the unprocessed plate-making roll 12.

Figure 6:
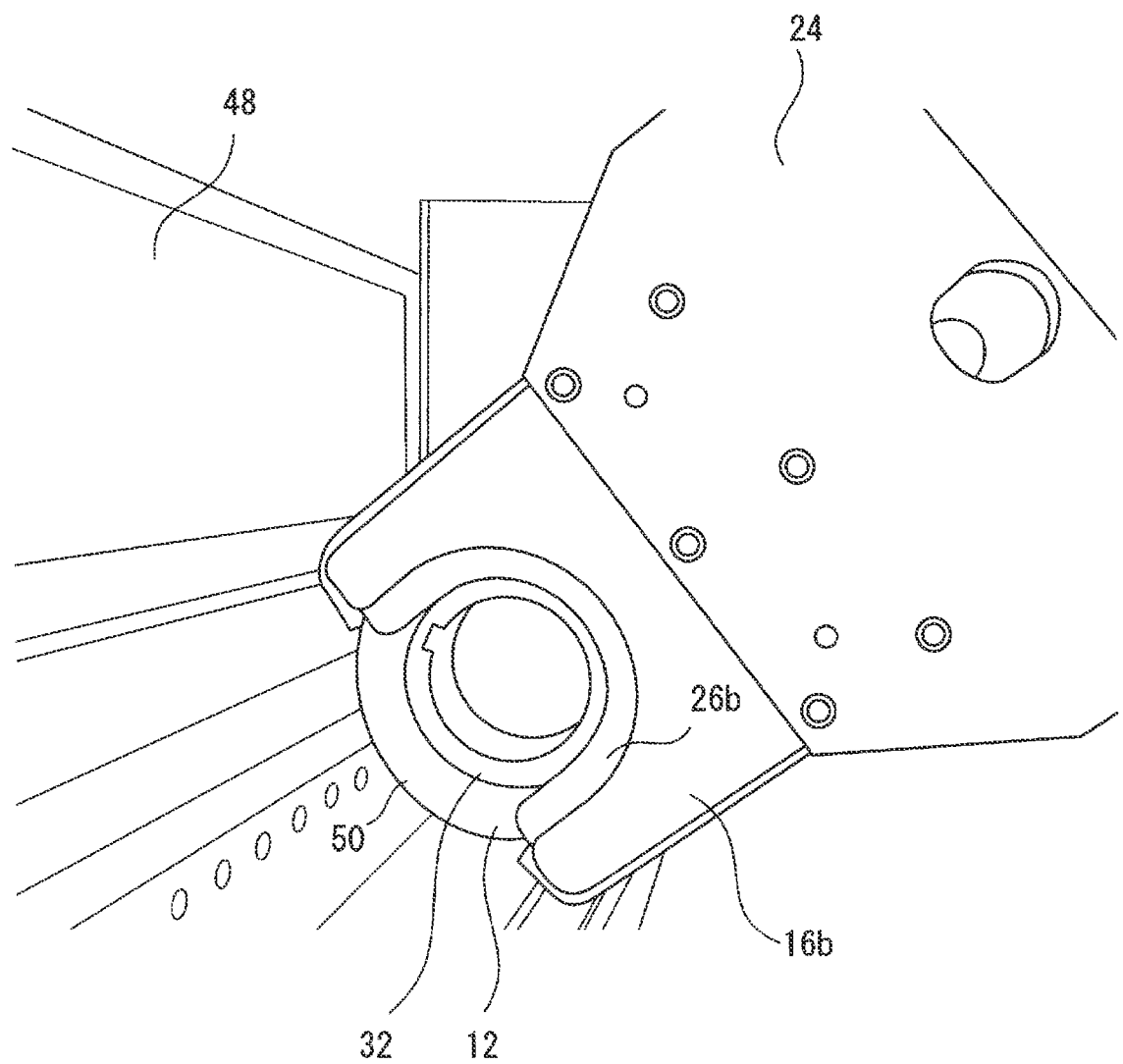
FIG. 6 is a perspective view for illustrating a state in which an unprocessed plate-making roll is gripped by the gripping portion structure of the gravure plate-making robot of the present invention.

FIG. 6 is a view for illustrating a state in which the unprocessed plate-making roll 12 being a hollow cylinder roll is gripped and transferred to each processing device through use of a gravure plate-making robot including the gripping portion structure 10A of a gravure plate-making robot. In FIG. 6, there is illustrated an example of each processing device 48, for example, a plating device in the fully automatic gravure plate-making processing system. As illustrated in FIG. 6, through use of the gravure plate-making robot including the gripping portion structure 10A of a gravure plate-making robot, the unprocessed plate-making roll 12 is accurately gripped and transferred to the processing device 48, and the unprocessed plate-making roll 12 is accurately set at a predetermined position of the processing device 48.

REFERENCE SIGNS LIST 10A, 10B: gripping portion structure of gravure plate-making robot, 12: unprocessed plate-making roll, 14: arm distal end of gravure plate-making robot, 16a, 16b, 17a, 17b: gripping plate, 18a, 18b, 34a, 34b, 46: gripping surface, 20a, 20b, 36a, 36b, 44: gripping surface forming members having non-slip function, 22: frame portion, 24: drive portion, 26a, 26b, 38a, 38b: mounting member, 28, 40: gripping plate cutout portion, 30, 42: gripping surface forming member cutout portion, 32: flange, 48: processing device for fully automatic gravure plate-making processing system, 50: end portions of unprocessed plate-making roll.

The invention claimed is:

1. A gripper of a robot for gripping and transferring a gravure plate-making roll, the roll being cylindrical and having axial end portion, the gripper comprising:
   a frame portion having a longitudinal axis, and opposite first and second longitudinal ends;
   a first gripping plate movably mounted on said first longitudinal end of said frame portion along said longitudinal axis;

a second gripping plate movably mounted on said second longitudinal end of said frame portion along said longitudinal axis, said first and second gripping plates being movable toward and away from each other on said frame portion;

a first gripping surface on said first gripping plate, said first gripping surface being configured to face said second gripping plate, said first gripping plate and said first gripping surface defining a cutout portion opened in a direction away from said frame portion;

a second gripping surface on said second gripping plate, said second gripping surface being configured to face said first gripping surface, said second gripping plate and said second gripping surface defining a cutout portion opened in said direction away from said frame portion, said first and second gripping surfaces having a curve, said curve being curved over a dimension greater than a diameter of the gravure plate-making roll, said curve being configured to cause said first and second gripping surfaces to contact the gravure plate-making roll predominantly at an outer circumferential edge of a respective one of the axial end portions of the gravure plate-making roll.

2. A gripper of a robot according to claim 1, further comprising:
a gripping surface forming member provided on each of the pair of gripping plates.

3. The gripper of a robot according to claim 2, wherein the gripping surface forming member comprises a plurality of gripping surface forming members, and wherein the plurality of gripping surface forming members form a gripping surface.

4. The gripper of a robot according to claim 2, wherein each of the pair of gripping plates has a gripping plate cutout portion opened downwardly, and wherein the gripping surface forming member also has a gripping surface forming member cutout portion so as to correspond to the gripping plate cutout portion.

5. The gripper of a robot according to claim 2, wherein the gripping surface forming member is made of a rubber or a synthetic resin.

* * * * *